United States Patent
Schniederjan et al.

(10) Patent No.: US 7,607,298 B2
(45) Date of Patent: Oct. 27, 2009

(54) HYDROSTATIC DRIVE

(75) Inventors: Reinhold Schniederjan, Neu-Ulm (DE);
Karl-Heinz Vogl, Ummendorf (DE);
Bernhard Wibberg, Geseke (DE)

(73) Assignee: Brueninghaus Hydromatik GmbH,
Elchingen (DE)

( * ) Notice: Subject to any disclaimer, the term of this patent is extended or adjusted under 35 U.S.C. 154(b) by 271 days.

(21) Appl. No.: 11/667,607

(22) PCT Filed: Nov. 3, 2005

(86) PCT No.: PCT/EP2005/011778
§ 371 (c)(1),
(2), (4) Date: Aug. 9, 2007

(87) PCT Pub. No.: WO2006/050854
PCT Pub. Date: May 18, 2006

(65) Prior Publication Data
US 2007/0295004 A1    Dec. 27, 2007

(30) Foreign Application Priority Data
Nov. 12, 2004  (DE)  ....................... 10 2004 054 744

(51) Int. Cl.
*F16D 31/02* (2006.01)
(52) U.S. Cl. ........................................ 60/464
(58) Field of Classification Search ............ 60/464, 60/487, 488, 489
See application file for complete search history.

(56) References Cited

U.S. PATENT DOCUMENTS

| 4,887,428 | A | * | 12/1989 | Iino ............................ 60/487 |
| 5,913,950 | A | | 6/1999 | Matsufuji |
| 6,338,247 | B1 | * | 1/2002 | Drin ............................ 60/489 |
| 6,442,934 | B1 | * | 9/2002 | Okuda et al. .................. 60/487 |

FOREIGN PATENT DOCUMENTS

| DE | 199 30 997 A1 | 5/2000 |
| DE | 199 34 782 A1 | 2/2001 |
| DE | 102 41 950 A1 | 3/2004 |
| JP | 2002-022005 | 1/2002 |

* cited by examiner

*Primary Examiner*—Michael Leslie
(74) *Attorney, Agent, or Firm*—Scully, Scott, Murphy & Presser, P.C.

(57) ABSTRACT

The invention relates to a hydrostatic drive comprising a hydraulic pump (1) and at least one hydraulic engine (3). Said hydraulic engine (3) is contacted to a closed circuit via a first working line (5) and a second working line (6). In order to limit the swept volume flowing in one of the two working lines (5) towards the hydraulic pump (1), a volume flow divider (60) is provided in the working line (5) and allows to remove a partial volume flow from the working line (5).

9 Claims, 2 Drawing Sheets

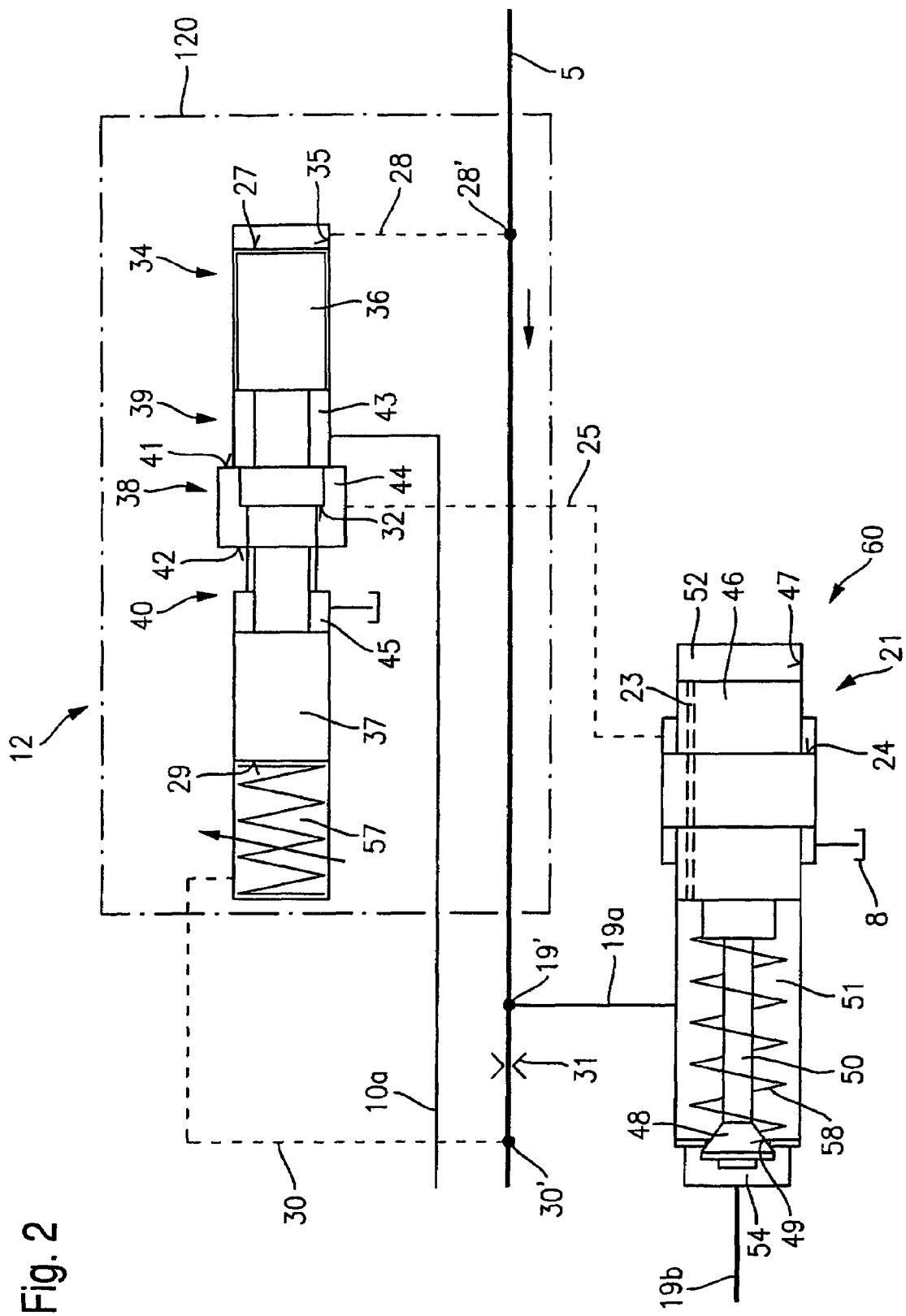

HYDROSTATIC DRIVE

Figure 1:
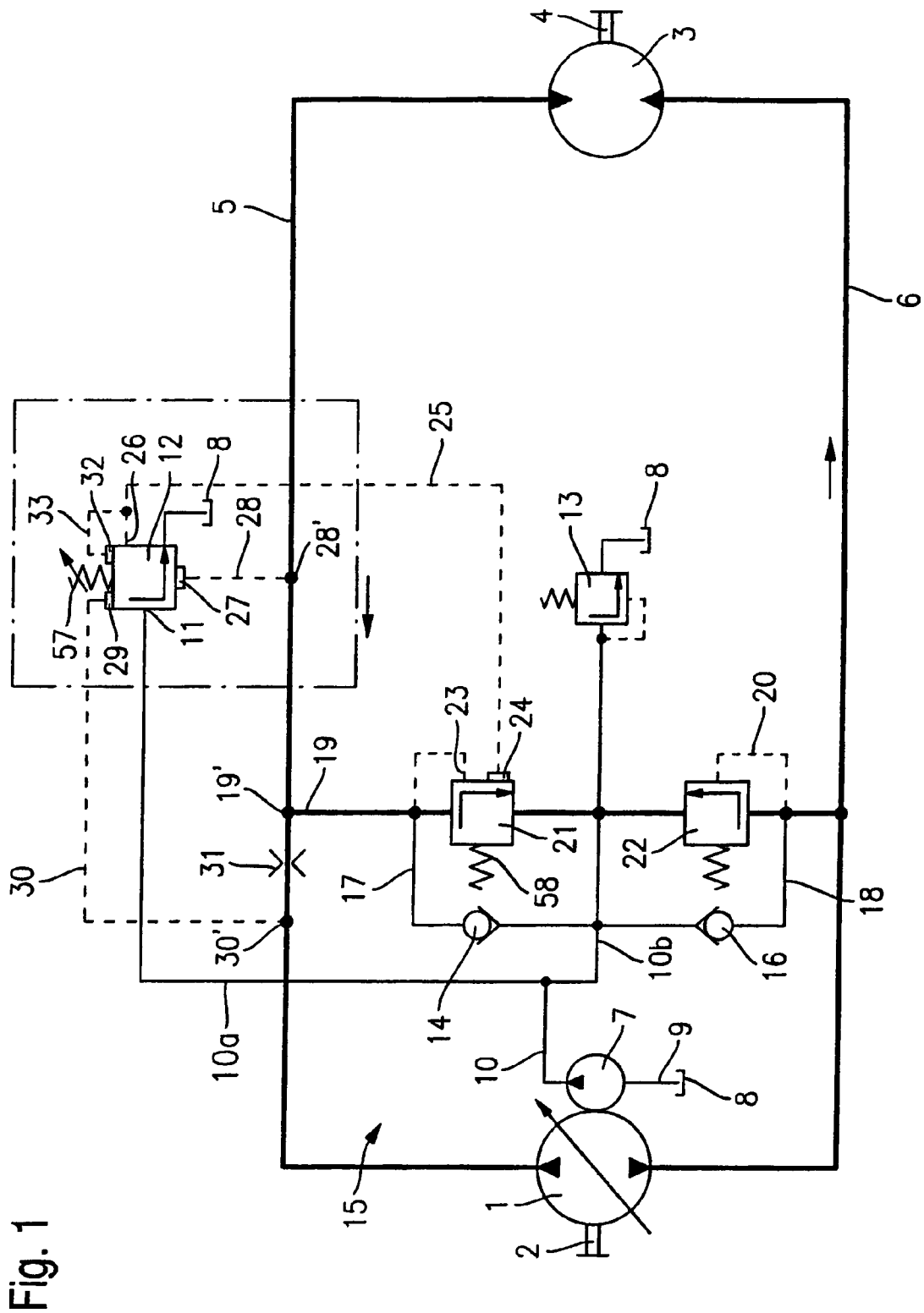

The invention relates to a hydrostatic drive having a hydraulic pump and a hydraulic engine in a closed circuit.

In hydrostatic drives such as are used, for example, in working machines, a hydraulic pump and a hydraulic engine are connected to one another via two working lines. As a rule, the hydraulic pump is driven by an internal-combustion engine. Depending upon the operating situation, it can happen that the hydraulic engine works against the braking moment of the internal-combustion engine. If the braking power occurring under these circumstances exceeds the braking moment of the engine, this leads to an inadmissible increase in the rotational speed of the internal-combustion engine, as a result of which the latter may, in the worst case, be destroyed.

In order to avoid such an inadmissible increase in the rotational speed of the internal-combustion engine, it is known from DE 102 41 950 A1 to provide, in the working line which is situated downstream of the hydraulic engine, a pressure valve by which the pressure acting on the induction side of the hydraulic pump is reduced as a result of an increase in the flow resistance in said working line. For the purpose of actuating the pressure valve, a hydraulic actuating element is provided, the pressure acting in said hydraulic actuating element being set by a control valve. If the pressure downstream of the pressure valve rises to a higher value, the actuating element is pressurised in such a way that said pressure valve is loaded in the direction of increasing closure. This adjustment leads to a higher drop in pressure at the pressure valve, so that a reduced pressure acts upon the induction side of the hydraulic pump and an inadmissible increase in the rotational speed of the driving unit is thereby prevented.

The hydrostatic drive described has the disadvantage that the total delivery volume which is delivered in the working line has to be controlled by the pressure valve. Control of this kind by means of a hydraulic actuating element and also of a multiway valve requires a considerable outlay in terms of design. In addition, it is impossible to avoid the development of considerable heat in the closed hydraulic circuit as a result of the major drop in pressure that prevails at the pressure valve.

The underlying object of the invention is to provide a hydrostatic drive in which limitation of the volume flow flowing through the hydraulic pump prevents the maximum supporting moment of a driving engine from being exceeded.

This object is achieved by means of the hydrostatic drive according to the invention having the features in claim 1.

The hydrostatic drive according to the invention has the advantage that a partial volume flow is tapped off from the working line by a volume-flow-divider in dependence upon a volume flow which is being delivered in said working line. The volume flow which is flowing through the working line is thus divided up into a volume flow which is delivered by the hydraulic pump and a partial volume flow which is removed from the working line. As a result of the removal of a partial volume flow from the working line, the hydraulic output which is fed to the hydraulic pump is reduced, without the need for heat to develop at a variable throttle, which is provided for that purpose, in the working line.

Under these circumstances, the quantity of pressure medium removed is regulated in dependence upon the volume flow which is being delivered in the working line. As a result of the dividing-up of the total volume flow into a partial volume flow and a volume flow which is fed onwards to the hydraulic pump, it is merely necessary to regulate the tapping-off of the partial volume flow. The remaining volume flow may remain unaffected, as a result of which the design is simplified.

The measures set out in the subclaims relate to advantageous further developments of the hydrostatic drive according to the invention.

It is particularly advantageous to regulate the quantity of pressure medium removed, by means of a control pressure which, in turn, is dependent upon a volume flow in the working line. For this purpose, it is particularly advantageous to provide a control-pressure-regulating valve whose input is connected to a feed-pressure pump. As a result of this, there is always made available, for actuating the valve which is responsible for removing the pressure medium from the working line, a control pressure which permits suitably rapid actuation of the valve.

Furthermore, it is advantageous to carry out the removal of the pressure medium via a pressure-limiting valve which is connected, on the input side, to the working line and, on the output side, to a feed apparatus. Under these circumstances, the pressure medium removed from the working line is fed back, via the pressure-limiting valve and the feed apparatus, into the working line situated upstream of the hydraulic engine. The working line on the induction side and the working line on the delivery side are short-circuited past the hydraulic pump. In addition, a safety apparatus which is already present, for example a pressure-limiting valve, can be utilised in advantageous manner in the feed apparatus.

A preferred exemplified embodiment of a hydrostatic drive according to the invention is represented in the drawings and will be explained in greater detail with the aid of the description which follows. In said drawings:

FIG. 1 shows a hydraulic circuit diagram of a hydrostatic drive according to the invention; and FIG. 2 shows a diagrammatic representation of the control-pressure-regulating valve and also of the pressure-limiting valve in FIG. 1.

FIG. 1 shows a hydraulic circuit diagram of a hydrostatic drive according to the invention. A hydraulic pump 1 is driven, via a drive shaft 2, by a driving machine which is not represented. Said driving machine which is not represented may, for example, be a diesel engine belonging to a mobile working appliance. The pressure medium delivered by the hydraulic pump 1, which is of adjustable design, is delivered to a hydraulic engine 3 which is connected to said hydraulic pump 1 via a first working line 5 and a second working line 6 in a closed hydraulic circuit. Said hydraulic engine 3 may be designed as a fixed-displacement engine and drives an output shaft 4 which is connected, for example, to a vehicle drive.

Also provided, along with the drive shaft 2, is a feed pump 7 which is preferably provided in the form of a constant-displacement pump and is intended for only one direction of delivery. Said feed pump 7 sucks in pressure medium from a tank volume 8 via an induction line 9 and delivers it into a feed-pressure line 10. Said feed-pressure line 10 branches into a first feed-pressure-line branch 10a and a second feed-pressure-line branch 10b. The first feed-pressure-line branch 10a is connected to an input connection 11 belonging to a control-pressure-regulating valve 12. In order to prevent an excessively high pressure in the feed-pressure line 10, or in the feed-pressure-line branches 10a and 10b, there is provided, at the second feed-pressure-line branch 10b, a feed-pressure-limiting valve 13 which releases the pressure in the second feed-pressure-line branch 10b into the tank volume 8 when a maximum admissible pressure is exceeded. For the purpose of setting the maximum feed pressure, the feed-pressure-limiting valve 13 is loaded with a spring which can preferably be set.

When it is brought into operation, the hydraulic system, which is initially devoid of pressure, is pressurised with a pressure medium by the feed pump 7. For this purpose, the second feed-pressure-line branch 10*b* is connected to the first working line 5 via a first non-return valve 14, and to the second working line 6 via a second non-return valve 16. The two non-return valves 14 and 16 are so oriented that they open, starting from the second feed-pressure-line branch 10*b*, in the direction of the first working line 5 and second working line 6 respectively. So long as the pressure in the feed-pressure line 10 or second feed-pressure-line branch 10*b* is higher than in the first working line 5 or second working line 6 respectively, the first non-return valve 14 or second non-return valve 16 respectively, opens, and the pressure medium delivered by the feed pump 7 is delivered into the first working line 5 or second working line 6 respectively. Said feed pump 7 forms, together with the feed line 9, the two feed-pressure-line branches 10*a* and 10*b* and the non-return valves 14 and 16 connected to the working lines, a feed apparatus 15.

The first non-return valve 14 is arranged in a first feed line 17 and the second non-return valve 16 is arranged in a second feed line 18. Said first feed line 17 opens into a first connecting line 19. Said first connecting line 19 connects the first working line 5 to the second feed-pressure-line branch 10*b* in parallel with the first non-return valve 14. A first pressure-limiting valve 21 is arranged in said first connecting line 19.

In corresponding manner, the second working line 6 is connected, via a second connecting line 20 to the second feed-pressure-line branch 10*b* in parallel with the second non-return valve 16. The second feed line 18 likewise opens into the second connecting line 20, in which a second pressure-limiting valve 22 is arranged.

In order to prevent an inadmissible rise in pressure in the first working line 5, the pressure acting in the first working line 5 acts, in the case of the first pressure-limiting valve 21, on the pressure-limiting valve 21 at a measuring connection 23 against the force of a spring 58. For this purpose, said measuring connection 23 is connected to the first connecting line 19 between the first working line 5 and the first pressure-limiting valve 21.

Below a critical pressure, the first pressure-limiting valve 21 is held, by the spring 58, in its starting position in which the first connecting line 19 is interrupted. If the pressure in the first working line 5 rises above a critical value in an inadmissible manner, an increasing connection of the first connecting line 19 is produced by the pressure acting at the measuring connection 23. As a result of this, pressure medium can escape from the first working line 5 into the feed apparatus 15 via the first connecting line 19.

The pressure medium which is delivered to the second feed-pressure-line branch 10*b* via the first pressure-limiting valve 21 can be delivered, via the non-return valve 16 and the second feed line 18, into the second working line 6, so long as a pressure which is lower than the maximum admissible feed pressure prevails in said second working line. Otherwise, the feed-pressure-limiting valve 13 opens and depressurises the first working line 5 into the tank volume 8.

The second pressure-limiting valve 22 is constructed in a corresponding manner and opens as soon as the pressure in the second working line 6 exceeds a pressure which is predetermined by the spring of said second pressure-limiting valve 22.

The first pressure-limiting valve 21 forms, together with the control-pressure-regulating valve 12, a volume-flow-divider 60 and has, additionally, a control-pressure connection on which a control-pressure-measuring face 24 is constructed. At said control-pressure-measuring face 24, the first pressure-limiting valve 21 can likewise be loaded, against the spring 58, with a hydraulic force. By this means, a connection between the first working line 5 and the second feed-pressure-line branch 10*b* can be produced independently of the force acting at the control-pressure-measuring face 24, and a partial volume flow can thereby be removed from the first working line 5 in dependence upon the control pressure, and fed to the feed apparatus 15.

The control-pressure-measuring face 24 is connected, via a control-pressure line 25, to an output connection 26 on the control-pressure-regulating valve 12. Said control-pressure-regulating valve 12 is loaded with a force in the direction of its starting position by a setting spring 57. In the opposite direction, said control-pressure-regulating valve 12 can be loaded with a hydraulic force at a first differential-pressure-measuring face 27. For this purpose, said first differential-pressure-measuring face 27 is connected to the first working line 5 via a measuring-pressure line 28. A further hydraulic force acts in the opposite direction at the control-pressure-regulating valve 12 and loads said control-pressure-regulating valve 12 at a second differential-pressure-measuring face 29. Said second differential-pressure-measuring face 29 is loaded with a pressure from the working line 5 which is removed from the latter via a second measuring-pressure line 30.

Unless otherwise indicated, the following explanations relate to a delivery in the direction of the hydraulic pump 1 via the second working line 6 and onwards, via the hydraulic engine 3, into the first working line 5 and back to said hydraulic pump 1. The pressure medium flowing back in the direction of the hydraulic engine 1 is divided by the volume-flow-divider 60 into a partial volume flow and the volume flow which is fed to the hydraulic pump 1.

In order to be able to adjust the control-pressure-regulating valve 12 in dependence upon the volume flow prevailing in the first working line 5, a measuring throttle 31 is constructed between a first point 28' of connection of the first measuring-pressure line 28 to the first working line 5 and a second point 30' of connection of the second measuring-pressure line 30 to said first working line 5. A differential pressure, which is proportional to the volume flow in the first working line 5, is thus present at the first differential-pressure-measuring face 27 and the second differential-pressure-measuring face 29. The control-pressure-regulating valve 12 is thus loaded with a volume-flow-dependent resulting positioning force.

As the volume flow increases, therefore, the control-pressure-regulating valve 12 is adjusted, against the force of the setting spring 57, in such a way that the first feed-pressure-line branch 10*a* is increasingly connected to an output connection 26. Under these circumstances, the feed pressure present at the input connection of the control-pressure-regulating valve 12 is increasingly fed to the control-pressure-measuring face 24 of the first pressure-limiting valve 21 via said output connection 26. As a result of this, the first pressure-limiting valve 21 is adjusted in the direction of an increasingly unthrottled connection of the connecting line 19.

Since, in the case of the direction of delivery indicated by arrows in FIG. 1, the first connecting line 19 is connected, upstream of the measuring throttle 31, to the first working line 5, a partial volume flow of pressure medium is tapped off from that part of said first working line 5 which is acted upon by the high pressure. This leads to a reduction in the volume flow arriving at the hydraulic pump 1, so that an increase in the rotational speed of the driving machine that drives said hydraulic pump 1 is prevented. As a reaction to the removal of the pressure medium from the first working line 5, the pressure difference at the first differential-pressure-measuring face 27 and the second differential-pressure-measuring face 29 is reduced, so that the control-pressure-regulating valve 12 is adjusted again in the opposite direction as a result of the force of the setting spring 57. A connection to a tank volume 8 is now produced instead of the connection to the output connection 26.

In the arrangement shown in FIG. 1, the volume flow fed to the hydraulic pump 1 is measured by the measuring throttle 31 after the removal of the partial volume flow.

Alternatively, said removal can also take place downstream of the second point 30' of connection. The measuring throttle then supplies a value concerning the total volume flow. Since the removal of the partial volume flow is regulated in dependence upon this total volume flow, the volume flow fed to the hydraulic pump 1 is likewise limited.

Constructed at the control-pressure-regulating valve 12 is an additional measuring face 32 which acts on said control-pressure-regulating valve 12 in the same direction in relation to the second differential-pressure-measuring face 29. Said additional measuring face 32 can be loaded, via a third measuring-pressure line 33, with the control pressure prevailing in the control-pressure line 25. As the control pressure in said control-pressure line 25 increases, the control-pressure-regulating valve 12 is thereby adjusted in the direction of a connection to the tank volume. The position of equilibrium of the control-pressure-regulating valve 12 is thereby regulated, not only by the setting spring 57 and the pressure difference prevailing, upstream and downstream of the measuring throttle 31, in the working line 5, but also as a result of the reactive coupling of the control pressure. This results in the volume flow in the direction of the hydraulic pump 1 being limited to a settable, constant value.

If the direction of delivery is reversed as a result of reversal of the adjustable hydraulic pump 1, there is present at the second differential-pressure-measuring face 29 a pressure which is higher, compared to the first differential-pressure-measuring face 27, on account of the reversing drop in pressure at the measuring throttle 31. The control-pressure-regulating valve 12 therefore remains in its position which is represented in FIG. 1 and the control-pressure line 25 is not loaded with the feed pressure. The control-pressure-measuring face 24 is therefore not loaded with the control pressure via the control-pressure line 25 and the first pressure-limiting valve 21 remains in its closed position.

The functioning of the first pressure-limiting valve 21 is then the same as that of the second pressure-limiting valve 22, namely that of a mere safety apparatus for limiting a maximum working-line pressure. By this means, a loss of pressure medium as a result of an unwanted removal from the first working line 5 is prevented in the case of a delivery of pressure medium by the hydraulic pump 1.

A detail of the hydraulic circuit diagram in FIG. 1, in which the control-pressure-regulating valve 12 and the first pressure-limiting valve 21 are represented in a preferred constructional embodiment, is shown in FIG. 2.

The control-pressure-regulating valve 12, which is designed as a pressure balance 120, has a stepped piston 34 which is arranged in a longitudinally displaceable manner in a stepped clearance 35. Said stepped piston 34 has, at its opposite ends, a first guide section 36 and a second guide section 37 respectively. The first differential-pressure-measuring face 27 is constructed on the end face of the stepped piston 34 on the same side as the first guide section 36. In a corresponding manner, the second differential-pressure-measuring face 29 is constructed on the opposite end face of the stepped piston 34 at the second guide section 37. In addition, the setting spring 57 acts upon the second differential-pressure-measuring face 29 and thus loads the stepped piston 34 in the axial direction with a spring force.

The stepped piston 34 is mounted in the stepped clearance 35 in a sealing, but axially displaceable manner, by means of the first guide section 36 and the second guide section 37. A control collar 38 is also constructed on the stepped piston 34 between the first guide section 36 and the second guide section 37. Said control collar 38 is connected to the first guide section 36 and the second guide section 37 via a first spacer section and a second spacer section, 39 and 40 respectively. Whereas, on the side that faces towards the first guide section 36, the control collar 38 preferably has the same diameter as said guide section 36, that side of the control collar 38 which faces towards the second guide section 37 is preferably reduced in its diameter compared to the latter. There is thereby produced, on said control collar 38, a step which is oriented in an identical way to the second differential-pressure-measuring face 29. Said step forms the additional measuring face 32.

A first control edge 41 is constructed at the transition between the control collar 38 and the first spacer section 39, and a second control edge 42 at the transition between said control collar 38 and the second spacer section 40. The stepped clearance 35, in which the stepped piston 34 is arranged, forms a first annular space 43 in the region of the first spacer section 39, as well as a second annular space 44 in the region of the control collar 38 and a third annular space 45 in the region of the second spacer section 40.

If the stepped piston 34 is located in its central position which is represented in FIG. 2, the first annular space 43 is separated from the second annular space 44, and said second annular space 44 from the third annular space 45, by a first control edge 41 and a second control edge 42, respectively, constructed on the control collar 38. If, on the other hand, the stepped piston 34 is displaced in the axial direction, a connection through which flow can take place is produced, by the control edge 41 or 42 respectively, either between the first annular space 43 and the second annular space 44 or between said second annular space 44 and the third annular space 45.

The first feed-pressure-line branch 10a, which is pressurised with the feed pressure by the feed pump 7, opens into the first annular space 43. The second annular space 44, on the other hand, is connected to the control-pressure line 25. If, as has already been described with reference to the hydraulic circuit diagram in FIG. 1, the stepped piston 34 is now moved against the force of the setting spring 57 as a result of an increase in the volume flow in the direction of the hydraulic pump 1, the first control edge 41 unblocks a connection, through which flow can take place, from the first annular space 43 to the second annular space 44. The pressure medium delivered into the first annular space 43 via the first feed-pressure-line branch 10a can thus flow into the control-pressure line 25.

The first pressure-limiting valve 21 likewise has a valve piston 46 which is arranged so as to be displaceable in the axial direction in a clearance 47. The valve piston 46 likewise has sections of differing diameter, the control-pressure-measuring face 24 being constructed at one of these discontinuities in diameter. If this control-pressure-measuring face 24 is loaded with the control pressure fed in via the control-pressure line 25, an axial force acts upon the valve piston 46 towards the left in FIG. 2. This axial force displaces said valve piston 46 against the force of the spring 58 and thereby lifts a sealing body 48 off a corresponding sealing seat 49. Said sealing body 48 is constructed as a cone and is connected to the valve piston 46 via a connecting rod 50. A spring compartment 51, which surrounds the connecting rod 50, is permanently connected to the first working line 5 via a first section 19a of the first connecting line 19. Under these circumstances, a third point 19' of connection between the first section 19a of the first connecting line 19 is located on the same side of the measuring throttle 31 as the first point 28' of connection of the first differential-pressure-measuring line 28.

That end face of the valve piston 46 which is oriented towards the spring compartment 51 is loaded with the pressure prevailing in the first working line 5 upstream of the measuring throttle 31. In a rearward piston space 52, the valve piston 46 is likewise loaded in the opposite direction at its end face with the pressure prevailing in the first working line 5. For this purpose, said rearward piston space 52 is connected to the spring compartment 51 via the measuring connection 23 which, in the exemplified embodiment represented, is designed as a bore which passes through said valve piston 46 in the axial direction. Because of the different faces upon which the pressure prevailing in the first working line 5 upstream of the measuring throttle 31 acts, the frustoconical sealing body 48 is also lifted off the sealing seat 49 in the event of a rise in pressure in the first working line 5 above a pressure threshold value which is determined by the spring 58. In the case of the frustoconical sealing body 48 which is lifted off the sealing seat 49, an annular gap which connects the spring compartment 51 to a volume 54 is unblocked between said sealing seat 49 and said frustoconical sealing body 48. The volume 54 is connected to a second section 19b of the first connecting line 19. Functioning as a mere safety valve is thus afforded as the control pressure disappears.

If the control pressure in the control-pressure line 25, and thereby also in the second annular space 44, rises, a hydraulic force which increases with the control pressure acts upon the stepped piston 34 at the additional measuring face 32. This increasing hydraulic force acts, jointly with the force of the setting spring 57, against the resultant of the forces acting on the first and second measuring faces of the control piston 34 as a result of volume flow. This increasing force, which acts against the differential pressure, displaces the stepped piston 34 back towards the right in FIG. 2, so that the connection between the first annular space 43 and the second annular space 44 is increasingly interrupted by the first control edge 41. At the same time, the second annular space 44 is increasingly connected to the third annular space 45 via the second control edge 42. The control pressure prevailing in the second annular space 44 can therefore be relieved in the direction of the tank volume 8 via the third annular space 45. The stepped piston 34 thus finds, in dependence upon a specific volume flow in the first working line 5 at any given time, a position of equilibrium in which a specific control pressure is produced. The first pressure-limiting valve 21 is opened in dependence upon this control pressure, in order to remove a partial volume flow from the first working line 5.

The threshold value, starting from which regulation of the control pressure and thus the removal of the partial volume flow takes place, can be set via the setting spring 57.

The invention claimed is:

1. Hydrostatic drive having a hydraulic pump and at least one hydraulic engine which is connected to said hydraulic pump via a first working line and a second working line,
wherein
for the purpose of limiting a delivery volume flowing in one of the working lines towards the hydraulic pump, a volume-flow-divider is provided in the said working line for the purpose of removing a partial volume flow from said working line, said volume-flow-divider having a control-pressure-regulating valve for the purpose of producing a control pressure which is dependent upon a volume flow in said working line.

2. Hydrostatic drive according to claim 1,
wherein
the partial volume flow can be regulated in dependence upon a volume flow in the working line.

3. Hydrostatic drive according to claim 1,
wherein
the volume-flow-divider comprises a pressure-limiting valve connected to the working line for the purpose of removing a partial volume flow from said working line.

4. Hydrostatic drive according to claim 3,
wherein
the working line can be connected to a feed apparatus by the pressure-limiting valve.

5. Hydrostatic drive according to claim 3,
wherein
the pressure-limiting valve can be loaded with a control pressure in the direction of opening.

6. Hydrostatic drive according to claim 1,
wherein
the control-pressure-regulating valve is connected to a feed-pressure pump for the purpose of producing the control pressure.

7. Hydrostatic drive according to claim 1,
wherein
the control-pressure-regulating valve is constructed as a pressure balance having a stepped piston which is loaded, at oppositely directed faces, with a first and a second pressure, respectively, prevailing in the working line.

8. Hydrostatic drive according to claim 7,
wherein
a setting spring additionally acts on the stepped piston.

9. Hydrostatic drive according to claim 7,
wherein
the stepped piston is loaded, at an additional measuring face, with the control pressure which loads said stepped piston with a hydraulic force in the direction of a reduction in said control pressure.

* * * * *